(12) United States Patent
Warner

(10) Patent No.: US 8,173,089 B2
(45) Date of Patent: May 8, 2012

(54) METHOD FOR THE SEPARATION OF SOUR GAS

(75) Inventor: Jan Piet Warner, Zierikzee (NL)

(73) Assignee: Airpack Holding B.V., RN Zierikzee (NL)

( * ) Notice: Subject to any disclaimer, the term of this patent is extended or adjusted under 35 U.S.C. 154(b) by 35 days.

(21) Appl. No.: 12/809,022

(22) PCT Filed: Dec. 18, 2008

(86) PCT No.: PCT/NL2008/000282
§ 371 (c)(1),
(2), (4) Date: Aug. 3, 2010

(87) PCT Pub. No.: WO2009/082200
PCT Pub. Date: Jul. 2, 2009

(65) Prior Publication Data
US 2011/0195004 A1    Aug. 11, 2011

(30) Foreign Application Priority Data
Dec. 21, 2007 (NL) .................................. 2001111

(51) Int. Cl.
*B01D 53/52* (2006.01)

(52) U.S. Cl. ........................................................ 423/220
(58) Field of Classification Search .................. 423/220, 423/168, 187
See application file for complete search history.

(56) References Cited

U.S. PATENT DOCUMENTS

| | | | |
|---|---|---|---|
| 4,654,202 A | 3/1987 | Walker | |
| 4,691,074 A | 9/1987 | Walker | |
| 2011/0195004 A1* | 8/2011 | Warner | ...................... 423/220 |

FOREIGN PATENT DOCUMENTS

| | | |
|---|---|---|
| FR | 2243722 A | 4/1975 |
| GB | 2167397 A | 5/1986 |
| NL | 1002560 C2 | 9/1997 |

* cited by examiner

*Primary Examiner* — Timothy Vanoy
(74) *Attorney, Agent, or Firm* — Morgan Lewis & Bockius LLP

(57) ABSTRACT

Method for separating a gaseous mixture that comprises as main ingredients $H_2S$ and $CO_2$, wherein the gaseous mixture is contacted in a first device with a solvent comprising a weak Lewis-acid, wherein $H_2S$ is absorbed in the solvent and the remaining $CO_2$ is abducted, and wherein the at least partially saturated solvent is regenerated subsequently, in at least one second device wherein the weak Lewis-acid comprises copper aluminum chloride ($Cu[AlCl_4]$) and wherein the solvent comprises monochlorobiphenyl (MCB).

10 Claims, 3 Drawing Sheets

METHOD FOR THE SEPARATION OF SOUR GAS

The invention pertains to a method for the separation of sour gas. The invention further pertains to an apparatus and the solvent that are used in the method.

Sour gas, a gaseous mixture of hydrogen sulfide ($H_2S$) and carbon dioxide ($CO_2$) is seen in the process industry and in particular in the petrochemical industry and in natural gas exploration, as an unwanted component in the method of processing, because sour gas, and in particular hydrogen sulfide, compromise said processes or lead towards environmentally unfriendly exhaust fumes when said gas is burned. In said burning process sulfur oxides and sulfuric acid are produced out of hydrogen sulfide, which compounds can result in extensive corrosion problems when the conditions are below the acid dew point. Furthermore, the exhaust of gaseous sulphur compounds in any chemical form is a considerable burden for the environment.

For the above reasons sour gas is usually separated from a main stream, for instance from a natural gas stream, after which separation the main stream may further be processed. A known method for separating the sour gas from a main stream uses a chemical absorption medium, or in other words, a solvent, in particular a solvent containing amine compounds is used.

A known method for processing sour gas into a sulfur end-product is the Claus-process. This process is based on partial oxidation of hydrogen sulfide by oxygen and/or air in combination with consecutive catalyzed equilibrium reactions, leading to the end-products sulfur and water.

During these reactions a large amount of heat is released which heat is also necessary for a satisfyingly high reaction velocity. A prominent disadvantage of this process for sour gas treatment is that the efficiency of the process is to a large extent dependent of the ratios $H_2S/CO_2$ of the gaseous mixture. At low ratios $H_2S/CO_2$, i.e. a large amount of $CO_2$ compared to $H_2S$, the relatively large inert mass of carbon dioxide is compromising the goal of a high temperature during the reactions. Furthermore the formation of sulfur in said equilibrium reactions is compromised by having a small amount of $H_2S$, resulting in a further lowering of the efficiency of the process.

There are enrichment processes from the prior art to raise the ratio $H_2S/CO_2$ in order to reduce the above mentioned disadvantages. These enrichment processes are usually performed in a sub-unit of the installation in which the sour gas is produced, and they entail a considerable burden, in the sense that the installation as a whole is made more complex. Furthermore, these enrichment processes are not able to achieve a complete separation between carbon dioxide and hydrogen sulfide. Such a complete separation is however necessary to produce hydrogen sulfide and/or carbon dioxide in a suitable form for use as an industrial precursor.

It is an object of the invention to provide an efficient, simple and inexpensive method for the separation of sour gas, in which above-mentioned problems are solved partially, or completely.

To achieve said goal, a method is provided for the separation of a gaseous mixture that comprises as main ingredients $H_2S$ and $CO_2$, wherein the gaseous mixture is contacted in a first device with a solvent comprising a weak Lewis-acid, wherein $H_2S$ is absorbed in the solvent and the remaining $CO_2$ is abducted, and wherein the at least partially saturated solvent is regenerated subsequently, in at least one second device wherein the released $H_2S$ is abducted.

In this way, an efficient method is provided for the separation of sour gas, without the need of using Claus-units. In this process it is advantageous that the ratio $H_2S/CO_2$ in the gaseous mixture does not, or only to a small extent, affect the efficiency of the process, because after absorption of $H_2S$ in the solvent a pure $CO_2$-gas stream is obtained and this gas stream does not have to be processed further.

Preferably the strength of the weak Lewis-acid is such that no Friedel-Kraft reactions do occur with regard to the solvent. It is advantageous when the Lewis-acid has a strong affinity with $H_2S$ and no or little affinity with $CO_2$.

In a preferred embodiment of the method according to the invention the weak Lewis-acid comprises copper aluminium chloride ($Cu[AlCl_4]$) and more preferred even comprises the solvent monochlorobiphenyl (MCB). Although a combination of both compounds is known as such from the Dutch patent no. 1002560, in which the combination is used for the separation of gases in a feed stream, the present invention is based on the discovery that using a combination of above compounds is extraordinarily efficient in separating sour gas. It has been found that the use of the solvent according to the invention, makes a purity of end-products possible to such an extent that they can be readily used as an industrial precursor.

Preferably the solvent is contacted with the sour gas in counter-current fashion, which has the effect of improving the absorption of $H_2S$ by the solvent. In addition, it is advantageous to maintain a pressure between 6 and 10 bar in the first device at a temperature of approximately 50-70 degrees Celsius. As a large amount of heat is released during the absorption process which has the effect of delaying the absorption process, it is furthermore advantageous to cool the first device. The use of a wetted wall reactor as heat exchanger, wherein the surface for heat exchange concomitantly serves as a surface for mass transfer in the absorption process, is preferred.

Also the regeneration process of the solvent in the second device is preferably performed in a wetted wall reactor, wherein the solvent is led over the wetted wall, during which $H_2S$ is stripped and subsequently abducted from the device. The pressure in the second device does not need a drastic lowering of pressure, such as for instance described in the Dutch patent 1002560.

The construction of a wetted wall reactor will be further elucidated in the examples and figures below. Basically, the reactor consists of an inner space for the absorption process or regeneration process, which comprises tubular spaces, and an outer space that surrounds the tubular spaces and is of importance for the heat exchange.

As it is advantageous to maintain a temperature in the second device preferably between 140 and 150 degrees Celsius, the heat that is released in the first device during the absorption process, is according to a further preferred embodiment of the method of the invention, transferred by means of a medium to the second device. In contrast to the absorption in the first device, it is advantageous to apply a higher temperature during the regeneration process, as it improves the velocity of the regeneration process.

Besides it is remarked that it is not obvious to transfer heat from the first to the second device because the temperature in the second device is higher than in the first device, as a consequence of the two different processes that are performed in them. Such a heat transfer was not applied or suggested before in the prior art.

It was found to be particular advantageous to use a medium that comprises a condensable organic vapour, for transferring heat from the first to the second device. The term condensable means that the medium, dependent of the circumstances applied, can be in gas or liquid form in the method according to the invention. In general, the medium will emit its heat during condensation and absorb its heat during evaporation.

In a further preferred embodiment of the method according to the invention, the medium is compressed before it is transferred to the second device. For this goal a compressor is for example situated in the heat trajectory from the first to the second device. The compressor will densify the medium and concomitantly raise the temperature of it. As a consequence, the amount of heat absorbed in the first device, is raised before it is used in the second device. Such a compression step improves the heat transfer from the first to the second device.

Preferably the medium is recycled from the second device back to the first device in order to cool the first device, wherein said medium is cooled during the recycle. In such manner, a closed cooling circuit is provided, in which the heat released during the absorption process is being used for the regeneration process of the solvent. The energy needed for compression of the medium in this circuit, is merely a fraction of the absorption heat or enthalpy, respectively the regeneration heat or enthalpy. As such, the method according to the invention is very advantageous with regard to energy consumption.

The use of the wetted wall reactor has an advantage during regeneration in that the solvent by virtue of dropping as a falling film within the tubular spaces, is able to desorb the $H_2S$-gas it contains, in a relatively easy way. In the tubular spaces, the gas ascends countercurrent to the solvent, and because of the spreading out of the solvent over the walls of the tubular spaces, the $H_2S$-gas can flow relatively freely in upwards direction in terms of rheology, before eventually exiting the tubular spaces.

In a further preferred embodiment of the method according to the invention, the regeneration process of the at least partially saturated solvent comprises further the stripping of the solvent by means of introducing at least a part of the abducted $CO_2$ from the first device. Preferably the introduction of $CO_2$ as a stripping gas occurs in a third device, more preferably a column. This process can be referred to as a post-regeneration. By leading a pure gas stream of $CO_2$ along the solvent which is coming from the second device, any traces of $H_2S$ remaining in the solvent after regeneration in the second device, will be purged out of the solvent, so that a regenerated solvent which is virtually $H_2S$-free, can be recycled to the first device. Such post-regeneration has the advantage that the first regeneration can be performed under atmospheric pressure and that a usually applied, lowered pressure (known from the prior art) is not necessary.

In general, the use of $CO_2$ as stripping medium during regeneration is advantageous because no foreign stripping gas such as nitrogen is necessary, which would have to be procured at financial expenses or had to be formed at the location using expensive apparatus and large amounts of energy.

The mixture of $H_2S/CO_2$ that originates from such a second regeneration step or post-regeneration, is subsequently recycled to the first device as well.

Preferably the abducted $CO_2$ from the first device is heated before it is used for the regeneration process, and more preferably, the heating of the abducted $CO_2$ comprises heat exchange between regenerated solvent and the $CO_2$ to be used as stripping medium. The heat of the solvent coming from the second device, respectively the second regeneration step, is hereby transferred to the $CO_2$ to be used as stripping medium.

In a further preferred embodiment of a method according to the invention, the at least partially saturated solvent is heated by the regenerated solvent before being regenerated in the second device. As the absorption of $H_2S$ preferably is performed at low temperature, the remaining heat of the regenerated solvent is advantageously transferred to the at least partially saturated solvent, so that the regeneration process of the solvent profits from the heat transferred. Preferably the exchange of heat between the regenerated solvent on the one hand, and the at least partially saturated solvent and the recycled $CO_2$ gas on the other hand, is performed in the same heat exchanger.

The invention relates further to the use of the solvent comprising copper aluminium chloride ($Cu[AlCl_4]$) and monochlorobiphenyl (MCB) for the separation of a gaseous mixture that comprises $H_2S$ and $CO_2$ as main ingredients, according to the method as described above. The invention relates further to an apparatus for use in the method for the separation of the gaseous mixture according to the invention.

The invention will further be elucidated by appended figures illustrating preferred embodiments of the invention, wherein.

Figure 1:
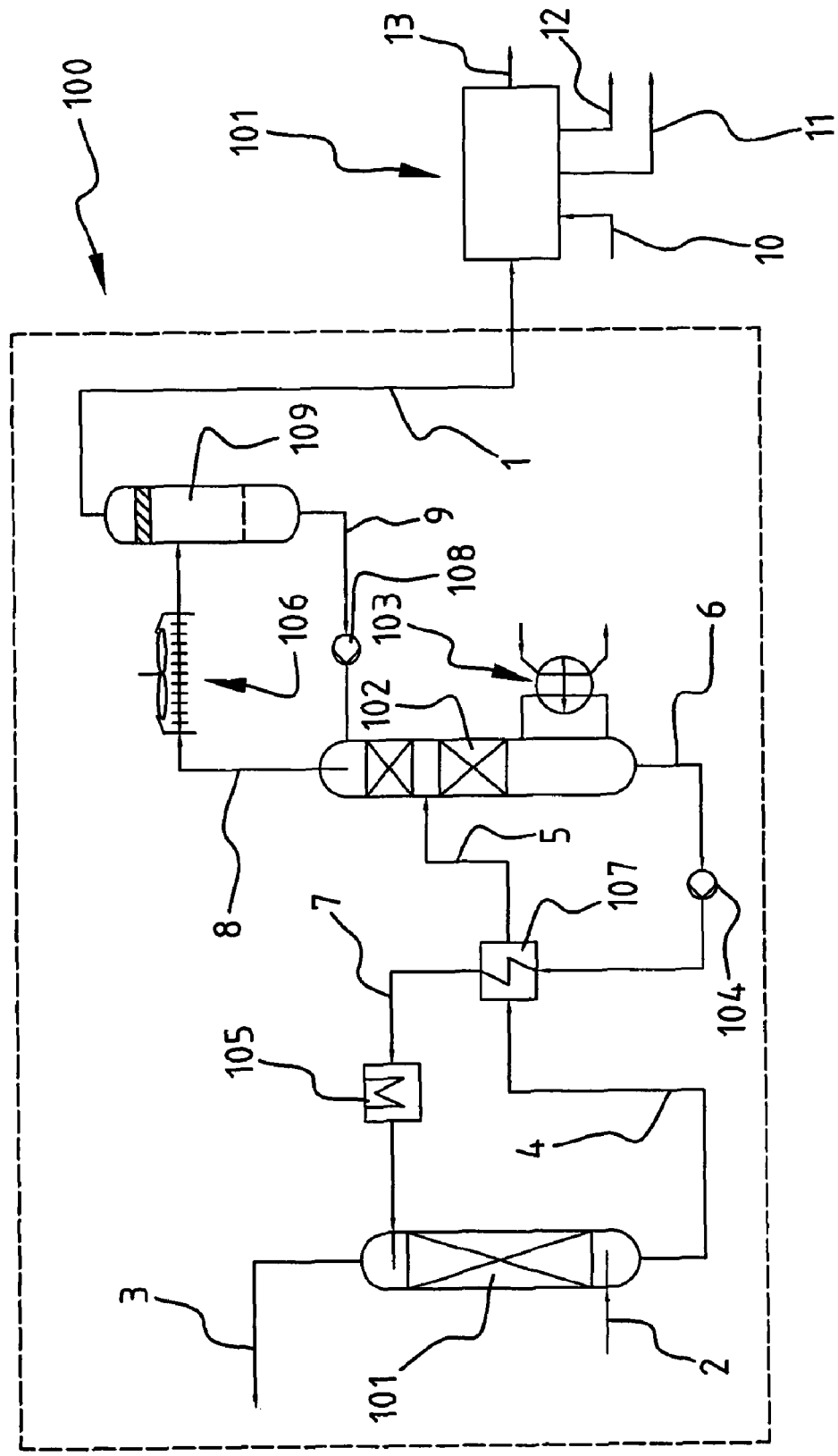
FIG. 1 shows a process scheme of a known method for separation of sour gas from a main stream using amine compounds.

In FIG. 1 a process scheme 100 is shown of a known method for separating sour gas from a main stream 2. The main stream 2, which may be a natural gas stream, is led towards a sour gas absorption column 101, in which the main stream 2 is contacted with a solvent with amine compounds. The solvent is introduced at ambient temperature using a cooling device 105 at the top side of the column 101, and the solvent having absorbed sour gas, is abducted via conduit 4 from column 101. The purified main stream leaves via conduit 3 the system for further processing.

The conduit 4 is led through a heat exchanger 107 in which the heat of a conduit 6 is transferred to conduit 5. The stream in conduit 5 is a heated solvent which is enriched, i.e. at least partially saturated, and is introduced in a regenerator 102, in which the sour gas is stripped and abducted through conduit 8. Heat is conducted towards the regenerator 102 by a reboiler 103 so as to accelerate the regeneration process. The solvent is recycled through a conduit 6 via a pump 104, the heat exchanger 107 and cooler 105 eventually to the absorption column 101.

The separated sour gas is dried via conduit 8 in condensing device 106, and in column 9 the water is separated and recycled to the regenerator 102. On the top side of the column a pure sour gas stream is obtained in a conduit 1 subsequently.

The sour gas stream 1 is processed further in a known method by a sulphur processing unit 110, which consists of usually one or several Claus-units. By adding an oxidant 10 pure sulphur 12 is obtained with by-products comprising the condensate of the process 11 and the remaining gas 13. As already indicated above, the ratio $H_2S/CO_2$ is of great importance for the functioning of the sulphur processing unit 110. Too large an amount of $CO_2$ can slow down the process or make it even completely impossible. In such cases it may be possible to add an extra column in the system 100, in order to lower the $CO_2$ ratio in the sour gas stream 1. Such an additional step reduces the efficiency of the process and furthermore such a system may become highly expensive.

Figure 2:
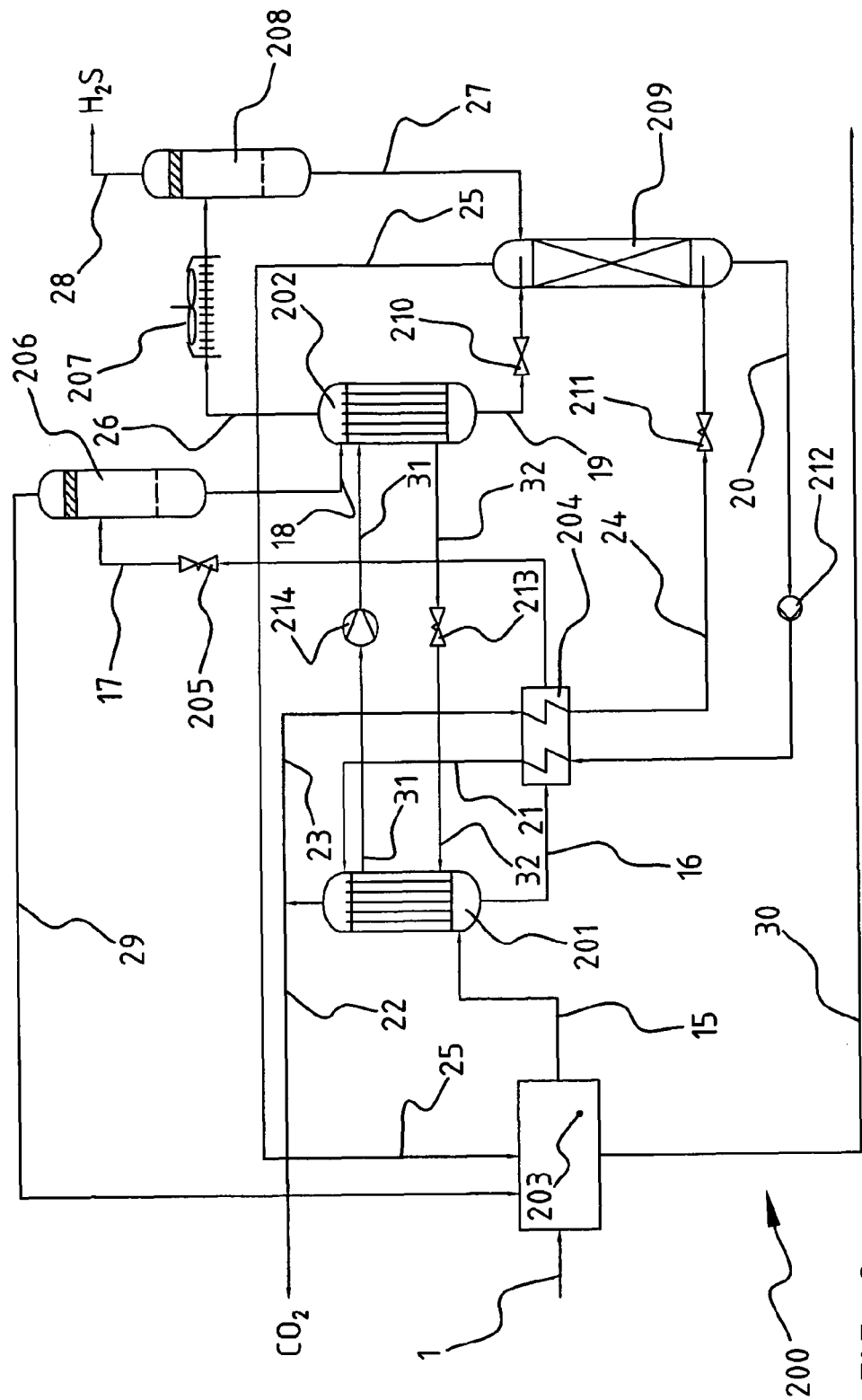
FIG. 2 shows a process scheme of a method for separation of sour gas according to the invention.

In FIG. 2 a process scheme 200 is shown for separating sour gas 1 according to the invention. Importantly, the depicted process is virtually insensitive to the ratio $H_2S/CO_2$, so that an additional enrichment step which usually is necessary in the known method may be left out.

The sour gas stream 1, i.e. a gaseous stream having main ingredients $H_2S$ and $CO_2$, is first led towards a compression and drying device 203 for the removal of all possibly present water in said stream 1. The removal of said water can for instance be performed by cooling and by application of molecular sieves. It is of importance to remove water from stream 1, because water impedes the functioning of the solvent in the method. The stream 1 is preferably pressurized to a pressure of about 6-10 bar. Water and other possible components different from hydrogen sulphide and carbon dioxide, are abducted via a conduit 30 from the gas stream 1.

The pure sour gas is led via a conduit 15 towards an absorption column 201, preferably a wetted wall reactor, in which solvent led through conduit 21 is contacted in counter current fashion with the stream 15. The solvent consists of copper aluminium chloride (Cu $[AlCl_4]$) solved in monochlorobiphenyl (MCB). It was found that such a combination acts very well in the separation of sour gas because $H_2S$ dissolves very well in the solvent and the solvent according to the invention does virtually absorb no $CO_2$. The solvent absorbs the total amount of $H_2S$, so that a gas stream 22 that leaves the absorption column 201 at the top side consists of pure $CO_2$.

The absorption process is preferably performed under a pressure between 6-10 bar and at a temperature of 50-70 degrees Celsius. As heat is released during the absorption process and too high a temperature slows down the absorption process—because of a lowered affinity of the solvent for $H_2S$ at higher temperatures—, it is advantageous to cool the column 201. For this purpose a cooling conduit 32 is provided through which an organic vapour is led that absorbs the heat released during the absorption process, as well as leads the heat away so that the temperature in column 201 can be kept low. The complete cooling system will be discussed in more detail below.

At least partially saturated, or in other words, enriched solvent leaves the device 201 at the bottom side and the stream 16 is heated by a heat exchanger 204 from approximately 60° C. to 120° C., after which the heated, rich stream 17 is brought in a flash tank 206 via a valve 205, in which any possible, small amount of dissolved $CO_2$ present in the solvent, is released and recycled via conduit 29 to the compression or drying device 203. The rich solvent is conducted from the flash tank 206 to a regenerator 202 via conduit 18.

In regenerator 202, the $H_2S$ gas is subsequently stripped while supplying heat which originates from the absorption process of the gas in absorption column 201. The stripping is preferably performed at a temperature between 140-150° C. under atmospheric pressure. For this goal, a heat exchange circuit is provided. In the heat exchange circuit the heat generated in absorption column 201 during the absorption process, is absorbed in a surrounding space (not shown) by means of an organic liquid that evaporates. The vapour formed is subsequently led through a conduit 31 and a compressor 214 (preferably a compressor of the displacement type) to a surrounding space (not shown) which heats the regenerator 202. In this surrounding space the medium condenses and emits at the same time its heat to the regenerator 202. In this way a very energy efficient process of absorption and regeneration is provided, in which the heat produced in one process is transferred to the other, while accelerating both processes. The pump or compressor 214 which is used in the process, requires an amount of energy which is relatively small when compared to the energy in terms of the heat of absorption and regeneration that is transferred.

The released $H_2S$ gas is abducted via conduit 26 from regenerator 202 and cooled in cooling device 207. At this stage also small amounts of MCB will condense and this solvent is regained in an atmospheric column 208 and recycled via a conduit 27 to a second regenerator 209. The gas that is released at the top side of the atmospheric column 208 is pure $H_2S$-gas, which, because of its purity, is suitable as an industrial precursor, for instance in producing sulphur and numerous other products.

Also the solvent that is released at the bottom side of the regenerator 202 is led via a conduit 19 and a valve 210 towards a second regenerator 209, which operates also under atmospheric pressure. In this second regenerator 209 the last amount of remaining $H_2S$ in the solvent is purged out of the solution by introducing a pure $CO_2$-stream 23 from the absorption column 201. The $CO_2$-stream 23 is first heated up to approximately 120° C., by a heat exchanger 204, and subsequently contacted with solvent exiting from conduits 19 and 27, in the regenerator 209. The contact with $H_2S$-free $CO_2$ releases the last remaining amounts of $H_2S$ from the solvent, and the $H_2S$ containing $CO_2$-gasstream 25 that is formed, is recycled to the compression and drying device 203. This secondary generation step secures that a virtually $H_2S$-free solvent is obtained. As the solvent still has a temperature of about 120° C., the solvent is led via conduit 20 and pump 212 through the heat exchanger 204, where the regenerated solvent 20 heats the rich solvent 16 and the $CO_2$-stream 23, before it is recycled back into the absorption column 201 via conduit 21.

The use of a second regeneration step in the second column 209 makes it possible to regenerate solvent under atmospheric pressure, as well as to a very high purity. The use of the already present, $H_2S$-free $CO_2$-gas, is very advantageous in this method. It will be clear that such a method of regenerating a solvent is very energy efficient when compared to, for instance, regeneration under vacuum circumstances. Also, the efficient exchange of heat between the several streams, for instance between the streams passing through the heat exchanger 204, contributes to the highly energy saving character of the described method.

Figure 3:
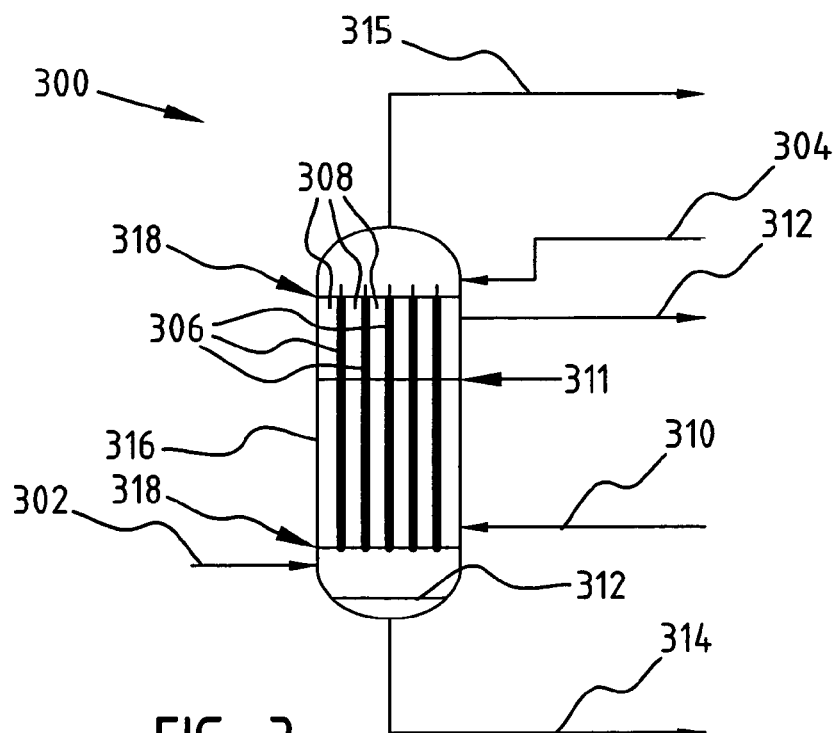
FIG. 3 shows schematically a wetted wall reactor which is used for absorbing $H_2S$-gas in the solvent according to the invention.

In FIG. 3 a wetted wall reactor 300 is shown having at the bottom side an incoming current of sour gas 302, and at the top side an incoming current of solvent 304. Schematically shown is the middle part of the reactor 300 which is provided with a multitude of tubular spaces 306, through which the solvent 304 drips down along the inner walls of the tubular spaces 306 while the sour gas 302 rises in upward direction and passes alongside the solvent 304, over a relatively large contact surface. In addition, the reactor 300 has a space outside the tubular spaces 306, a so-called surrounding mantle space 308, in which the medium for heat exchange flows. The medium enters as a condensed current of organic vapour 310, i.e. it is actually in its liquid phase. Examples of a suitable medium are hexane and toluene. The condensed vapour 310 fills the mantle space 308 up to an indicated level 311, above which the compound makes a transition into a gas phase, and subsequently exits the mantle space 308 as organic vapour 312.

The heat that is formed during the absorption of $H_2S$ from the sour gas 302 into the solvent 304, is transferred to the mantle space 308 and functions as a source of energy for the evaporation of the condensed vapour 310.

At the bottom side of the reactor, the so-called fat or enriched solvent 312 is collected in liquid form, and led via conduit 314 to a regeneration process, for instance in a second wetted wall reactor, which is not shown, but functions in a way analogous to what is explained above.

At the top side a gas stream 315 which is $H_2S$-free, leaves the reactor.

Tubular spaces are connected with each other and the outer wall 316 of the reactor, by connecting material 318 which allows for openings at the top and bottom side of the tubular spaces, while sealing the spaces between tubular spaces and as such delimiting the mantle space 308.

Figure 4:
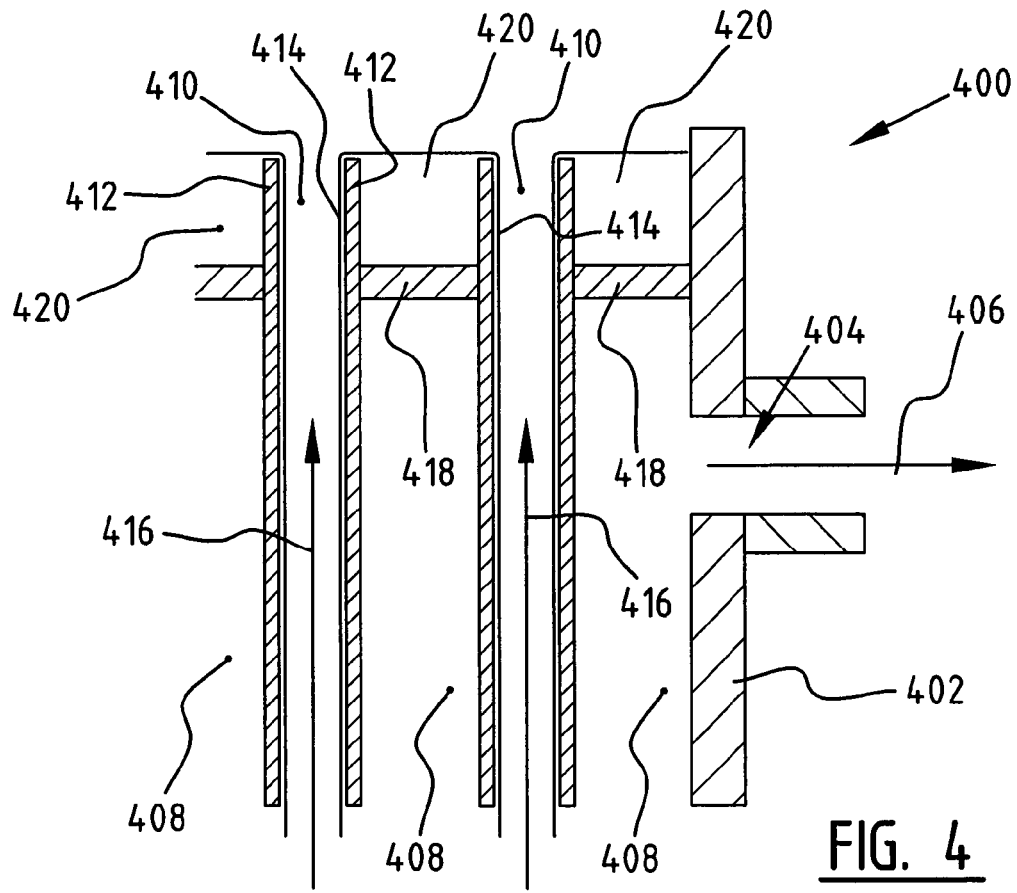
FIG. 4 shows a detail of the wetted wall reactor of FIG. 3.

Finally in FIG. 4, a detail 400 is shown of the wetted wall reactor of FIG. 3. It concerns the left upper side of the reactor 300.

In FIG. 4, shown in more detail are the integrated outer wall 402 of the reactor, and the exit 404 for organic vapour 406 from the mantle space 408. Further are shown the tubular spaces 410, which are delimited by the inner walls 412, along which a film of solvent 414 flows downwards, while sour gas 416 ascends at the central inner side. The tubular spaces 410 are connected with each other and with the outer wall 402 by the connecting material 418, which material is positioned slightly below the endings at the upper side of the tubular spaces 410, so that the endings project slightly above the connecting material 418. As a consequence, a small reservoir 420 is formed during the introduction of solvent 414, before the solvent flows as a film along the inner walls 412 in downward direction. As such, an optimum surface of contact is achieved between the liquid phase of the solvent 414 on the one hand, and the gas phase of the sour gas 416 on the other hand.

Furthermore, the use of such a reactor for regeneration, in which saturated solvent flows along the inner walls in downward direction analogous to the description above, will achieve a satisfactory evaporation of the $H_2S$-gas from the solvent, because the current of $H_2S$-gas can flow away without physical hindrance within the tubular spaces, while the solvent flows downward as a film.

The invention is not limited to the above described embodiment, but includes other embodiments as well, which are covered by the wordings of the appended claims.

The invention claimed is:

1. Method for separating a gaseous mixture that comprises as main ingredients $H_2S$ and $CO_2$, wherein the gaseous mixture is contacted in a first device with a solvent comprising a weak Lewis-acid, wherein $H_2S$ is absorbed in the solvent and the remaining $CO_2$ is abducted, and wherein the at least partially saturated solvent is regenerated subsequently, in at least one second device wherein the released $H_2S$ is abducted, wherein the heat released in the first device during the absorption process, is led towards the second device by means of a medium.

2. Method according to claim 1, wherein the weak Lewis-acid comprises copper aluminum chloride ($Cu[AlCl_4]$).

3. Method according to claim 1, wherein the solvent comprises monochlorobiphenyl (MCB).

4. Method according to claim 3, wherein the medium comprises a condensable organic vapour.

5. Method according to claim 3, wherein said medium is compressed before it is led towards the second device.

6. Method according to claim 3, wherein the medium is recycled from the second device towards the first device, for cooling of the first device, and wherein the medium is cooled during the recycling.

7. Method according to one of the claim 1, wherein the process of regeneration of the at least partially saturated solvent further comprises the stripping of the solvent by means of introducing at least a part of the $CO_2$ abducted from the first device.

8. Method according to claim 7, wherein the $CO_2$ abducted from the first device, which is used for the stripping of solvent, is heated before it is introduced in the regeneration process.

9. Method according to claim 8, wherein the heating of the abducted $CO_2$ from the first device, comprises exchanging heat between regenerated solvent and said $CO_2$.

10. Method according to one of the claim 1, wherein the at least partially saturated solvent is heated by the regenerated solvent, before it is regenerated itself in the second device.

* * * * *